United States Patent [19]
Chludzinski

[11] Patent Number: 6,092,391
[45] Date of Patent: *Jul. 25, 2000

[54] HELIUM RECYCLING FOR OPTICAL FIBER MANUFACTURING

[75] Inventor: Paul Andrew Chludzinski, Wilmington, N.C.

[73] Assignee: Corning Incorporated, Corning, N.Y.

[ * ] Notice: This patent is subject to a terminal disclaimer.

[21] Appl. No.: 09/281,555

[22] Filed: Mar. 30, 1999

Related U.S. Application Data

[63] Continuation of application No. 08/981,525, filed as application No. PCT/US97/09968, Jun. 9, 1997, Pat. No. 5,890,376.
[60] Provisional application No. 60/020,796, Jun. 24, 1996.
[51] Int. Cl.⁷ ........................................... F25J 1/00
[52] U.S. Cl. ............................. 62/608; 619/656
[58] Field of Search ............................ 62/608, 619, 657

[56] References Cited

U.S. PATENT DOCUMENTS

| | | | |
|---|---|---|---|
| 3,181,307 | 5/1965 | Kuerston | 62/639 |
| 3,333,435 | 8/1967 | Stewart | 62/639 |
| 3,792,591 | 2/1974 | Collins | 62/40 |
| 4,444,572 | 4/1984 | Avon et al. | 55/26 |
| 5,223,014 | 6/1993 | Yamauchi et al. | 65/4.21 |
| 5,377,491 | 1/1995 | Schulte | 62/63 |
| 5,452,583 | 9/1995 | Schulte | 62/63 |

FOREIGN PATENT DOCUMENTS

| | | |
|---|---|---|
| 0 601 601 A1 | 6/1994 | European Pat. Off. |
| 0 820 963 | 1/1998 | European Pat. Off. |
| 60-103006 | 6/1985 | Japan |
| 56-109831 | 8/1991 | Japan |

OTHER PUBLICATIONS

Patent Abstracts of Japan, vol. 97, No. 10, Oct. 31, 1997 / JP 62 153132 A (Furukawa Electric Co. Ltd.) Jul. 8, 1987.
Patents Abstract of Japan, vol. 11, No. 381, Dec. 12, 1987 /JP 62 13132 A (Furukawa Electric Co. Ltd.), Jul. 8, 1987.
Patent Abstracts of Japan, vol. 9, No. 247, Oct. 3, 1985 & JP 60 103006 A (Touyou Sanso Co. Ltd.), Jun. 1985.
Patent Abstracts of Japan, vol. 17, No. 11, Jan. 8, 1993 / JP 04 240129 A (Sumitomo Electric Ind. Ltd.), Aug. 27, 1992.
Patent Abstracts of Japan, vol. 5, No. 184, Nov. 21, 1981 & JP 56 109831 A (NT&T Corp.), Aug. 31, 1981.
Patent Abstracts of Japan, vol. 9, No. 278, Nov. 6, 1984 / JP 60 122741 A (Hitachi Densen Co. Ltd.), Jul. 1, 1985.
Patent Abstracts of Japan, vol. 11, No. 124, Apr. 17, 1987 / JP 61 261223 A (Furukawa electric Co. Ltd.), Nov. 19, 1986.
Copy of PCT/US97/09968 International Search Report.
Copy of EP 97 92 9877 European Search Report.

*Primary Examiner*—Ronald Capossela
*Attorney, Agent, or Firm*—Edward F. Murphy; Randall S. Wayland

[57] ABSTRACT

Helium recycling for optical fiber manufacturing in which consolidation process helium is recycled either directly for use in consolidation at high purity or recycled at lower purity adequate for usage in draw or other processes having a lower helium parity. Integrated processes for recycling helium from two or more helium using processes in the optical manufacturing process are also described. Substantial helium and cost savings are recognized.

60 Claims, 5 Drawing Sheets

HELIUM RECYCLING FOR OPTICAL FIBER MANUFACTURING

This application is a continuation of U.S. patent application Ser. No. 08/981,525 filed on Dec. 11, 1997, to be issued on Apr. 6, 1999 as U.S. Pat. No. 5,890,376, which was a 35 U.S.C. Section 371 national state application of U.S. Patent Application PCT/US97/09968 filed on Jun. 9, 1997, which claimed priority to U.S. Provisional Application 60/020,796, filed on Jun. 24, 1996. This application claims priority to and incorporates herein by reference U.S. patent application Ser. No. 08/981,525 filed on Dec. 11, 1997, U.S. Patent Application PCT/US97/09968 filed on Jun. 9, 1997 and U.S. Provisional Application 60/020,796, filed on Jun. 24, 1996.

FIELD OF THE INVENTION

The present invention relates generally to improved methods and apparatus for helium recycling, and more particularly to improved helium recycling for use in conjunction with helium utilization in both the consolidation process of optical fiber manufacturing, as well as an integrated system and method of helium recycling for utilization in conjunction with multiple processes involved in optical fiber manufacturing.

BACKGROUND OF THE INVENTION

Helium is a relatively expensive gas which is used in large quantities in a variety of contexts. One such context is optical fiber manufacturing where it is typically utilized in a number of processes involved in the manufacture of optical fiber. Several factors make helium a candidate for recycling. It is a nonrenewable resource recovered as a byproduct from natural gas wells. Consequently, it is expensive. Since it is a noble gas, it does not react, thus, it can be suitably recovered and reused.

Nonetheless, until recently, helium has not been recycled as part of the optical fiber manufacturing process. Two recent patents, U.S. Pat. Nos. 5,452,583 and 5,377,491, incorporated by reference herein in their entirety, have addressed the subject of helium recycling in the context of recycling helium used as a coolant gas in the draw fiber cooling process utilized in optical fiber manufacturing. While the draw process is the process which typically utilizes the most helium, these patents neither address the potential interrelationship of other helium utilizing processes in optical fiber manufacturing, nor the desirability, nor the practical aspects of how to implement recycling in other specific processes such as the consolidation process.

SUMMARY OF THE INVENTION

Consequently, a need exists to provide methods and apparatus for a more integrated approach to helium recycling in optical fiber manufacturing, and also for specific approaches to achieve helium recycling in the consolidation process. The present invention provides such approaches.

In one aspect of the present invention, a method of recycling helium may suitably comprise the steps of feeding helium of a first level of purity to a consolidation furnace; recovering waste helium from the consolidation furnace; feeding recovered waste helium to a helium purifier; purifying the recovered waste helium utilizing the helium purifier to produce an output stream of recycled pure helium satisfactory for reutilization in the consolidation process; feeding recycled pure helium to the consolidation furnace; and reutilizing the recycled pure helium in the consolidation process.

In another aspect of the present invention, a method of recycling helium may suitably comprise the steps of collecting waste helium from a plurality of helium utilizing processes; controllably delivering the collected waste helium to a helium purifier which produces an output stream of pure recycled helium and an output stream of impurities; storing the pure recycled helium; and reutilizing the pure recycled helium in optical fiber manufacturing.

In another aspect of the present invention, a method of recycling helium may suitably comprise the steps of feeding a first stream of helium of a first level of purity to a first optical fiber manufacturing process; recovering waste helium with impurities from the first process; feeding the recovered waste helium to a first purifier; removing impurities utilizing the first purifier and producing a second stream of helium of a second level of purity; and feeding the second stream of helium to a second optical fiber manufacturing process.

Other aspects of the present invention relate to improvements in systems and apparatus for helium recycling in optical fiber manufacturing as more fully described below.

Various other aspects and advantages of the present invention will be apparent from a consideration of the drawings and the detailed description which follow.

DETAILED DESCRIPTION OF THE INVENTION

Figure 1:
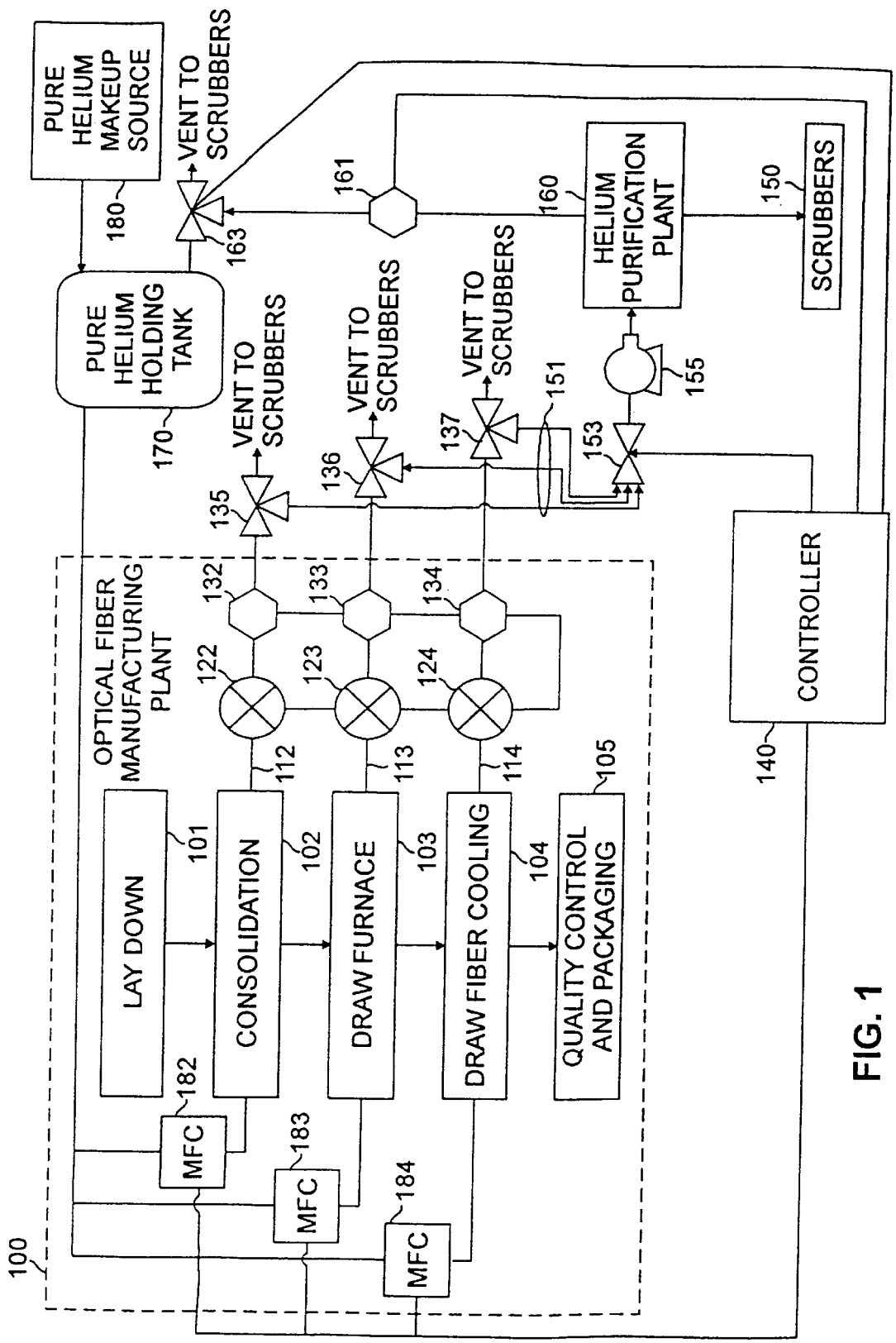
FIG. 1 is a block diagram illustrating the major helium consuming processes in an optical fiber manufacturing plant to which helium recycling according to the present invention may be suitably applicable.

FIG. 1 illustrates the overall processing steps in an optical fiber manufacturing plant 100. In plant 100, processing begins with a laydown process 101 in which a porous preform or soot blank is formed. Next, the preform is consolidated in a consolidation process 102. The clarified or clear blank is then introduced into a draw furnace 103. Next, draw fiber cooling 104 is done as optical fiber is pulled or drawn from the blank. Quality control and packaging 105 follow. Large amounts of helium are utilized in a number of processes in a plant such as plant 100. Draw fiber cooling 104, draw furnace purging 103, and consolidation processing 102 all utilize helium in large enough quantities to make helium recycling both profitable in terms of cost savings and desirable in terms of better management and utilization of a scarce resource.

As shown generally in FIG. 1, contaminated or spent helium is extracted from each process in the plant 100 utilizing a significant amount of helium. In FIG. 1, helium is shown being recovered from the processes 102–104. In different fiber optic manufacturing plants, additional helium utilizing processes may be employed, and it will be understood that helium may be recovered from them as well.

The recovered helium passes through recovery lines 112, 113 and 114, and valves 122, 123 and 124. The nature of the impurities in each of the helium streams may desirably be sensed utilizing sensors 132, 133 and 134 in conjunction with a suitably programmed controller or processor 140. The sensors may be infrared ("IR") sensors. Gas chromatography may also be utilized. Those of skill in the art will be able to select other suitable sensing mechanisms depending upon their particular application and the available resources.

Each of the helium streams may be selectively and controllably vented to a system of scrubbers 150 for suitably processing waste gases to meet environmental and safety standards for handling such gas streams. This venting may be controlled based on the outputs of the sensors 132–134 which are preferably connected to the controller 140 or a separate controller which will control the appropriate one of the three-way valves 135, 136 or 137.

If not vented, the helium streams are then fed on one or more feed lines 151, through one or more controllable valves 153, and one or more compressors 155 to a helium purification plant 160 which may suitably employ one or more purification arrangements. Exemplary existing purification components and systems include solid and fluid separation systems, cryogenic liquid upgrading systems, chemical adsorption systems, catalytic reaction systems, absorption systems, membrane separation systems and pressure or thermal swing adsorption systems. It is contemplated that further advances in such components and systems will be made, and that one of ordinary skill in the art will be able to select and combine such components to match the purification needed for the impurities of a given stream of helium to be recycled.

The helium purifier or purification plant 160 removes impurities such as nitrogen, $N_2$, oxygen, $O_2$, flourine, $F_2$, and other flourine containing compounds, chlorine, $Cl_2$, hydrochloric acid and other chlorine compounds, HCl, carbon dioxide, $CO_2$ and the like which may be typical byproducts of the various optical fiber manufacturing processes. For further details of such processes, see, for example, M. G. Blankenship and C. W. Deneka, "The Outside Deposition Method of Fabricating Optical Waveguide Fibers" I.E.E.E. Journal of Quantum Electronics, Vol. QE-18, No. 10, pp. 1418–1423. October 1982, and Kirk-Othmer *Encyclopedia of Chemical Technology,* Vol. 10 "Fiber Optics, pp. 125–147, 1980, incorporated by reference herein in their entireties, as well as the cited references therein. As discussed in further detail below, an integration of the recycling of helium from two or more processes may yield significant advantages over addressing each process separately.

From the helium purification plant 160, recovered pure helium is fed through a sensor 161 and a three-way valve 163 to a pure helium holding tank 170 which also receives pure helium make up gas from a source 180 to make up for helium not recovered in recycling. Sensor 161 is connected to the controller 140 and is utilized to make a check on the purity of the purified helium. If the helium does meet the process requirement, the helium is rejected and sent to the scrubbers 150 using the three-way valve 163.

Pure helium is fed from the tank 170 through mass flow controllers (MFCs) 182, 183 and 184 or other flow controllers to the plant 100 to meet the plant's ongoing needs for helium during processing. The suitably programmed controller or processor 140 or a plurality of processors distributed throughout the plant may be utilized to monitor and control flows, pressures, valves and the like throughout the system. Alternatively, manual adjustments may be made by plant personnel. While a single controller is shown, a plurality of processors or controllers may suitably be employed. Additional valves, pumps, pressure gauges, monitoring instruments and tanks may also be employed depending upon the environment and the application.

Figure 2:
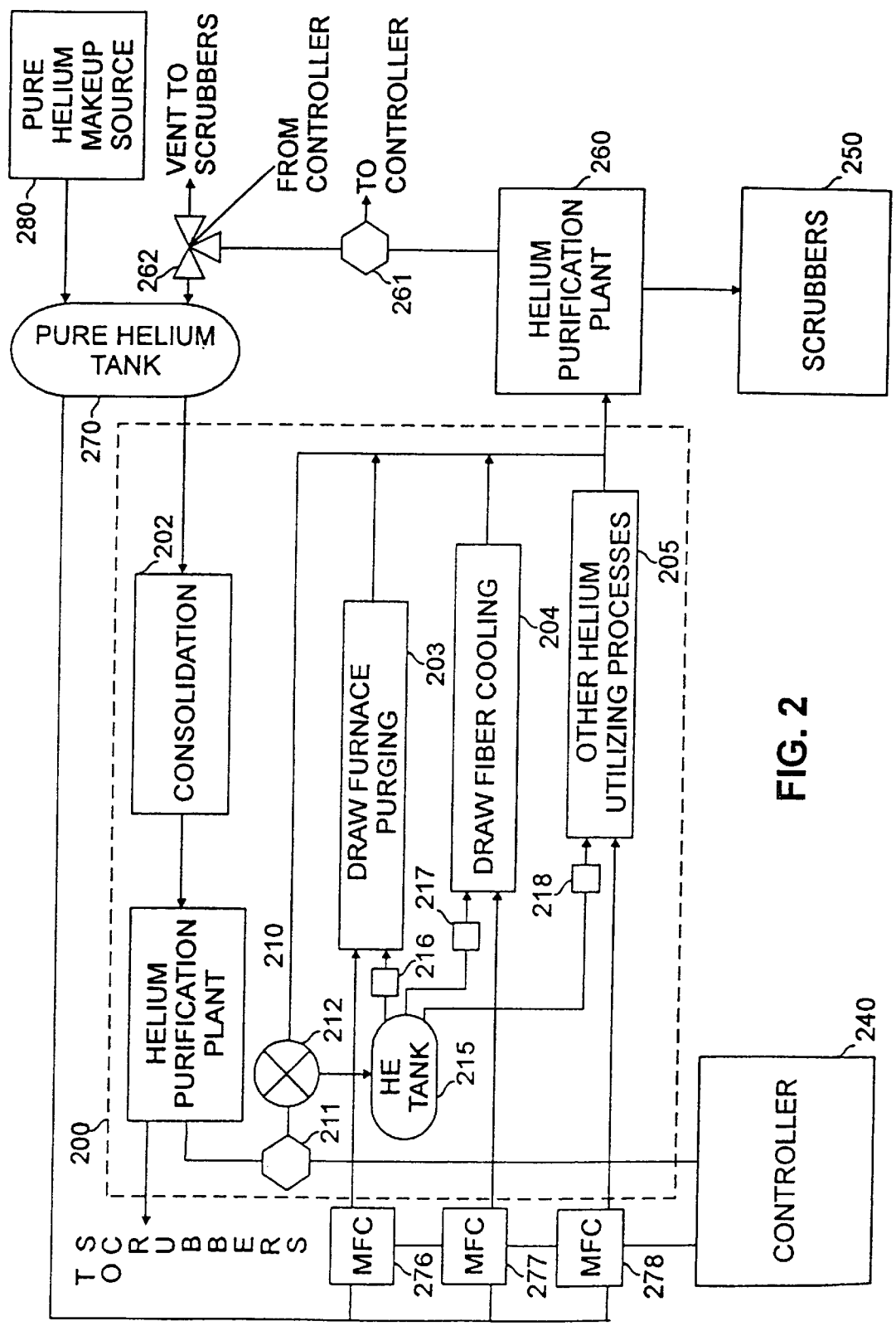
FIG. 2 illustrates one integrated system according to the present invention for recycling helium from both the consolidation, draw and other processes in which helium is utilized during optical fiber manufacturing.
Figure 3:
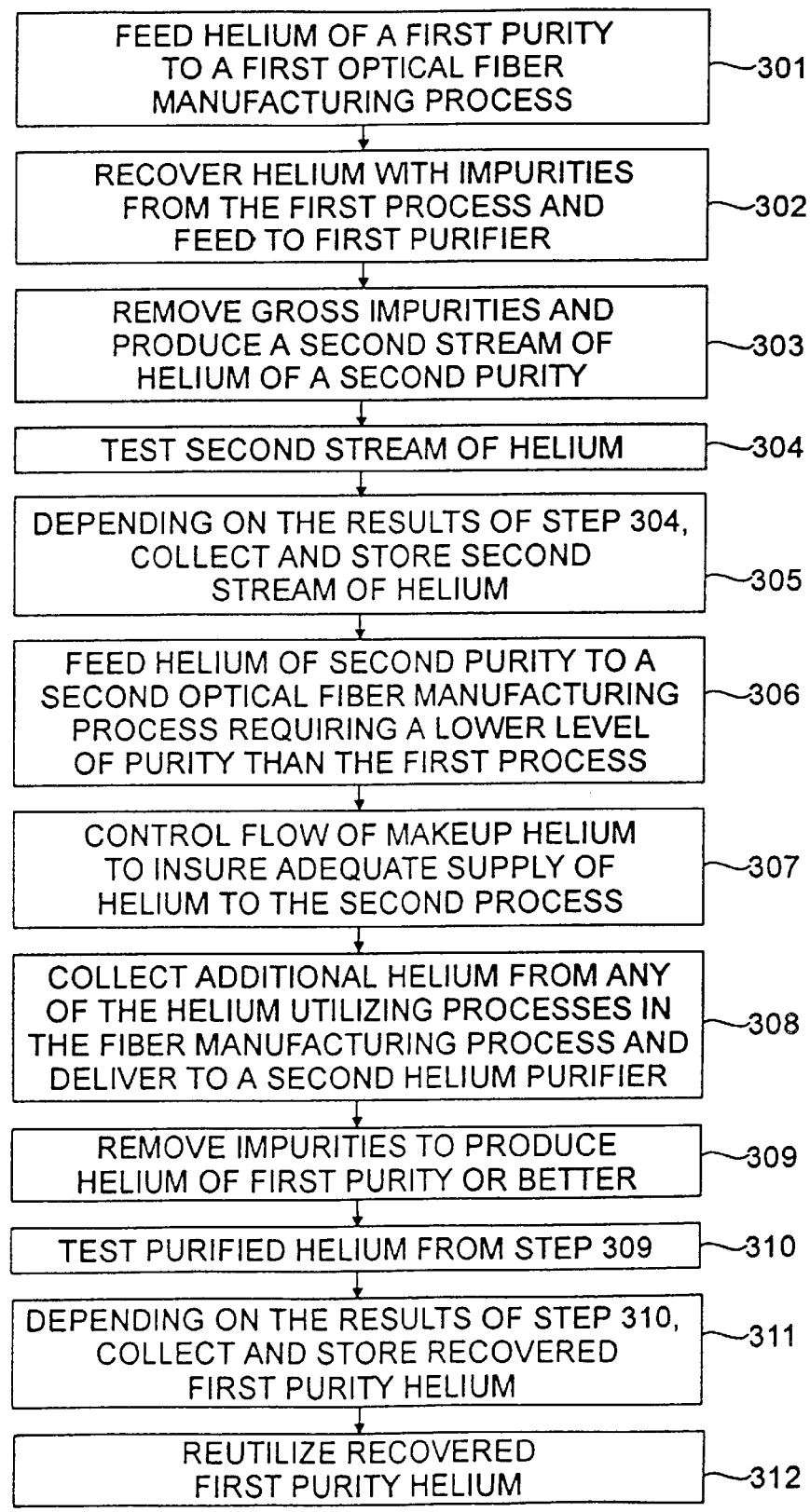
FIG. 3 is a flowchart illustrating an integrated method according to the present invention for recycling helium from multiple helium employing processes utilized in optical fiber manufacturing.

FIGS. 2 and 3 illustrate further details of an integrated system and method for providing helium recycling in accordance with the present invention. As shown in FIG. 2, a system in accordance with the present invention may suitably include an optical fiber manufacturing plant 200 employing a consolidation process 202, a draw furnace purging process 203, a draw fiber cooling process 204, and other miscellaneous processes utilizing helium 205. Other processes such as laydown, quality control and the like typically will also be employed but are not shown in FIG. 2 as little or no helium is typically used therein.

The optical fiber plant 200 also preferably includes a first helium purifier 210, a helium impurity sensor 211, a valve 212, a helium storage tank 215, MFCs 216–218 with their own processors for control or controlled by a controller 240, controller 240, a second helium purifier or purification plant 260 for removing impurities, an impurities sensor 261, a three-way valve 262, a second tank 270 for holding pure helium, MFCs 276–278 controlled by the controller 240, and a pure helium makeup source or sources 280.

One operation of the above equipment in accordance with the present invention is described below in conjunction with a discussion of FIG. 3. FIG. 3 illustrates a method 300 in which in step 301, a first stream of very pure helium, such as "five nines", 99.999%, or alternatively, 99.995% pure helium, is fed from a source of helium such as the tank 270 to a first process in an optical fiber manufacturing plant which requires helium at a first purity level, such as consolidation process 202 in optical fiber plant 200. In step 302, impure helium is recovered from the first process and fed to a first purifier, purifier 210. In step 303, gross impurities such as chlorine and hydrochloric acid are removed, and a second stream of pure helium having a second level purity of for example greater than about 95% is produced. In step 304, this second stream of helium may be tested utilizing a sensor and processor, such as the sensor 211 and controller 240, to confirm that this stream is suitable for usage in other processes such as draw furnace purging 203 or draw fiber cooling 204. In step 305, if the test results of step 304 are satisfactory, the helium is collected or stored and cooled, if necessary, utilizing components such as valve 212, a cooling unit or heat exchanger not shown, a compressor not shown, and tank 215. In step 306, this second level of purity helium is fed to one or more processes which requires a lower level of purity of helium. For example, the controller 240 and MFCs 216–218 can be utilized to control feeding of helium from the tank 215 to the draw furnace purging process 203, the draw fiber cooling process 204 or the other miscellaneous helium utilizing processes 205.

In step 307, a flow or flows of makeup helium of either 99.995% or less purity are controlled so that adequate helium is provided to processes, such as draw furnace purging 203 and draw fiber cooling 204 which typically utilize more helium than is used in the consolidation process 202. In step 308, waste helium is collected or recovered from one or more processes, such as any of the processes 202–205 and delivered to a second helium purifier, such as the helium purifier or purification plant 260. In step 309, impurities such as oxygen, $O_2$, nitrogen, $N_2$, and the like are removed or purged until first level purity, such as 99.995% pure helium results. In step 310, the purity of the helium from step 309 is tested. If the helium is not sufficiently pure for reutilization, it will be vented using a controllable valve, such as the valve 262. In step 311, where the helium has been tested as pure, the first level purity helium is collected in a tank such as the tanks 270. Finally, in step 312, high purity recycled helium is reutilized in a high purity process, such as the consolidation process 202.

The above described process takes into account that very pure helium such as 99.995% or sometimes five-nines pure is required for processes such as the consolidation process. During consolidation, helium and other gases such as chlorine and oxygen are employed to dry a glass preform formed in the laydown stage. Helium containing impurities from the consolidation process including chlorine is a byproduct of the consolidation process. Other processes, such as draw furnace purging and draw fiber cooling do not require helium of the same level of purity as consolidation.

In a presently preferred embodiment, the purifier 210 only serves to remove sufficient impurities, for example, the $Cl_2$ and HCl byproducts of the consolidation process, such that helium adequately pure for draw purging and draw cooling is produced. This purification is much less expensive then purifying all the recycled helium to 99.995% purity. As previously noted, while the consolidation process may require such very pure helium, the draw process which utilizes helium principally for purging or for heat transfer and cooling may require helium which is only about 95% pure.

Figure 4:
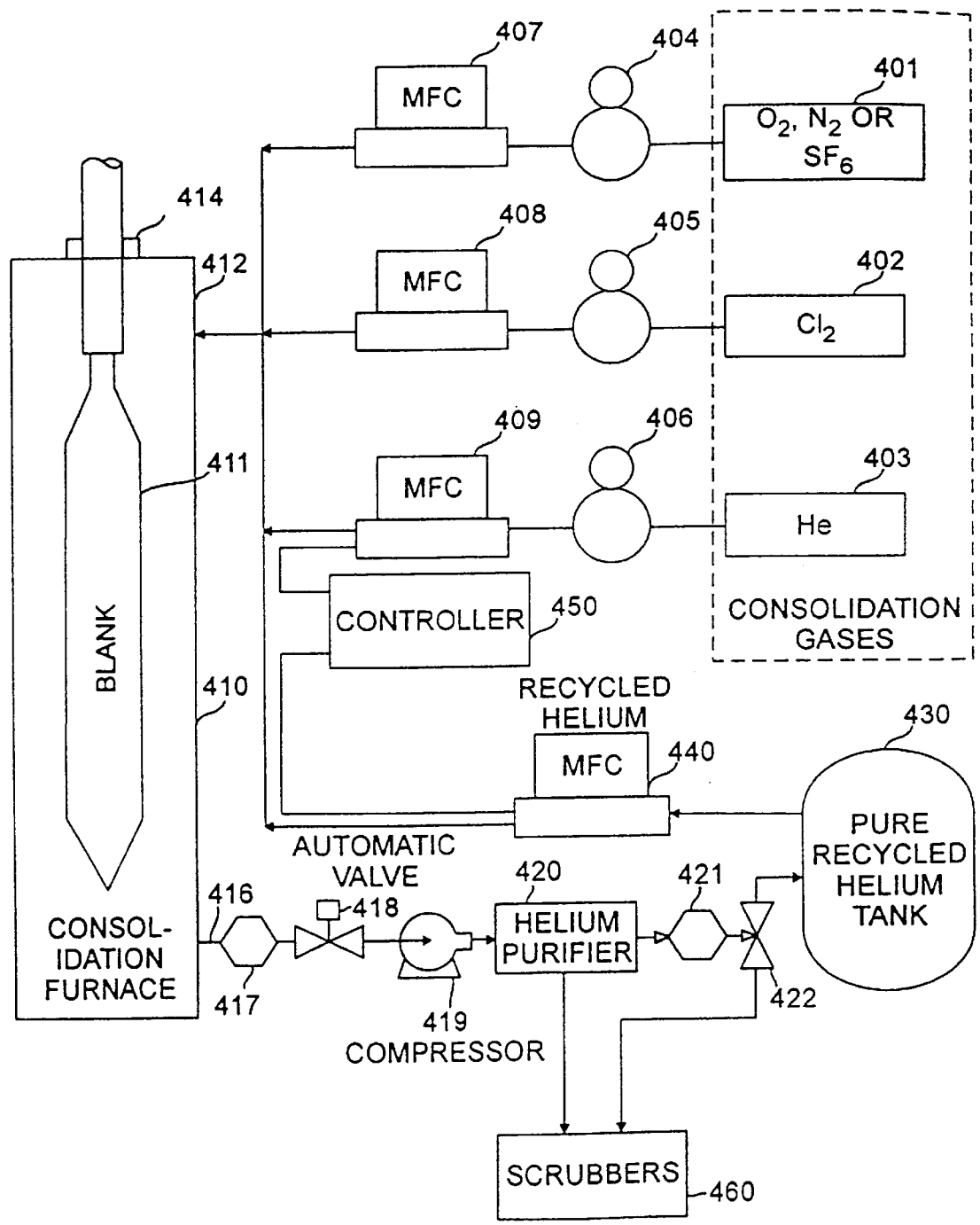
FIG. 4 illustrates details of helium recycling in accordance with the present invention as applied to the consolidation process utilized in optical fiber manufacturing.

In an alternative embodiment of the present invention, a method and apparatus for helium recycling in connection with the optical fiber manufacturing consolidation process is provided. FIG. 4 illustrates such apparatus 400 in block form. As shown in FIG. 4, consolidation gases such as oxygen, nitrogen, sulfur hexafluoride, $SF_6$, chlorine and helium are fed from respective sources 401, 402 and 403 through regulators 404, 405 and 406, and mass flow controllers ("MFCs") 407, 408 and 409. While illustrated in a single block, it will be understood that oxygen, nitrogen, sulfur hexafluoride, as well as other gases, might all be utilized with separate sources.

A blank or preform 411 to be consolidated is suspended in a known fashion in a consolidation furnace 410. The consolidation gases are introduced at the top 412 of the furnace 410. In the past, spent consolidation gases were simply vented to scrubbing facilities where they were further processed as necessary and then vented to the atmosphere. A top seal at the top of the furnace was fairly loose and a slight overpressure of helium was utilized to prevent outside air from entering the system and other gases such as chlorine from exiting the system.

In the present invention, it is desirable to employ an improved sealing mechanism 414 to reduce helium loss. Spent gases rather than being vented are drawn off through a recovery line 416, a sensor 417, an automatic valve 418 and a compressor 419 to a helium purifier 420. It is presently preferred that the amount of exhaust gas or waste helium out of the consolidation furnace 410 is controlled with the valve 418 based on a measured parameter, such as furnace pressure, exhaust flow, exhaust temperature or exhaust gas composition. The measurement of the measured parameter is made by a suitable sensor or sensors, such as the sensor 417. While in the discussion below, sensor 417 is principally discussed as a composition sensor, it will be recognized that pressure, flow and temperature sensors can also be utilized either alone or in connection. It is presently preferred that the exhaust gas flow be controlled based upon furnace pressure as the control loop input for valve 418.

Also, as discussed above, it may be desirable to employ a second purifier not shown in FIG. 4 to remove chlorine, hydrochloric acid and fluorine compounds before the automatic valve 418 and compressor 419 to reduce corrosion problems in these components.

The purifier 420 removes contaminants such as chlorine, hydrochloric acid, oxygen, nitrogen, silicon dioxide and any other consolidation process impurities to produce adequately pure helium, such as 99.995%, for recycling to the consolidation process. As discussed above, it is preferable to sense the purity of the recycled helium using a sensor 421 and controllers such as controller 450, and to vent this helium if it is not sufficiently pure using a three-way valve 422 controlled by the controller.

Pure recycled helium is fed to a pure recycled helium tank 430 and fed from the tank 430 through a recycled helium MFC 440 to join the consolidation gas stream introduced to the furnace 410 at input 412. The MFCs 409 and 440 are controlled by the system controller 450 to adjust the mix of helium from the source 403 and tank 430 to reflect helium losses and recycling inefficiencies. Scrubbers 460 are provided to process vented gases. While controller 450 is shown in FIG. 4. as connected to the MFCs 409 and 440, it will also typically be connected to the sensor 417, the valve 418 and any other process sensors or process control mechanisms, such as valves or MFCs, although those connections are not shown in FIG. 4 to simplify the illustration.

Figure 5:
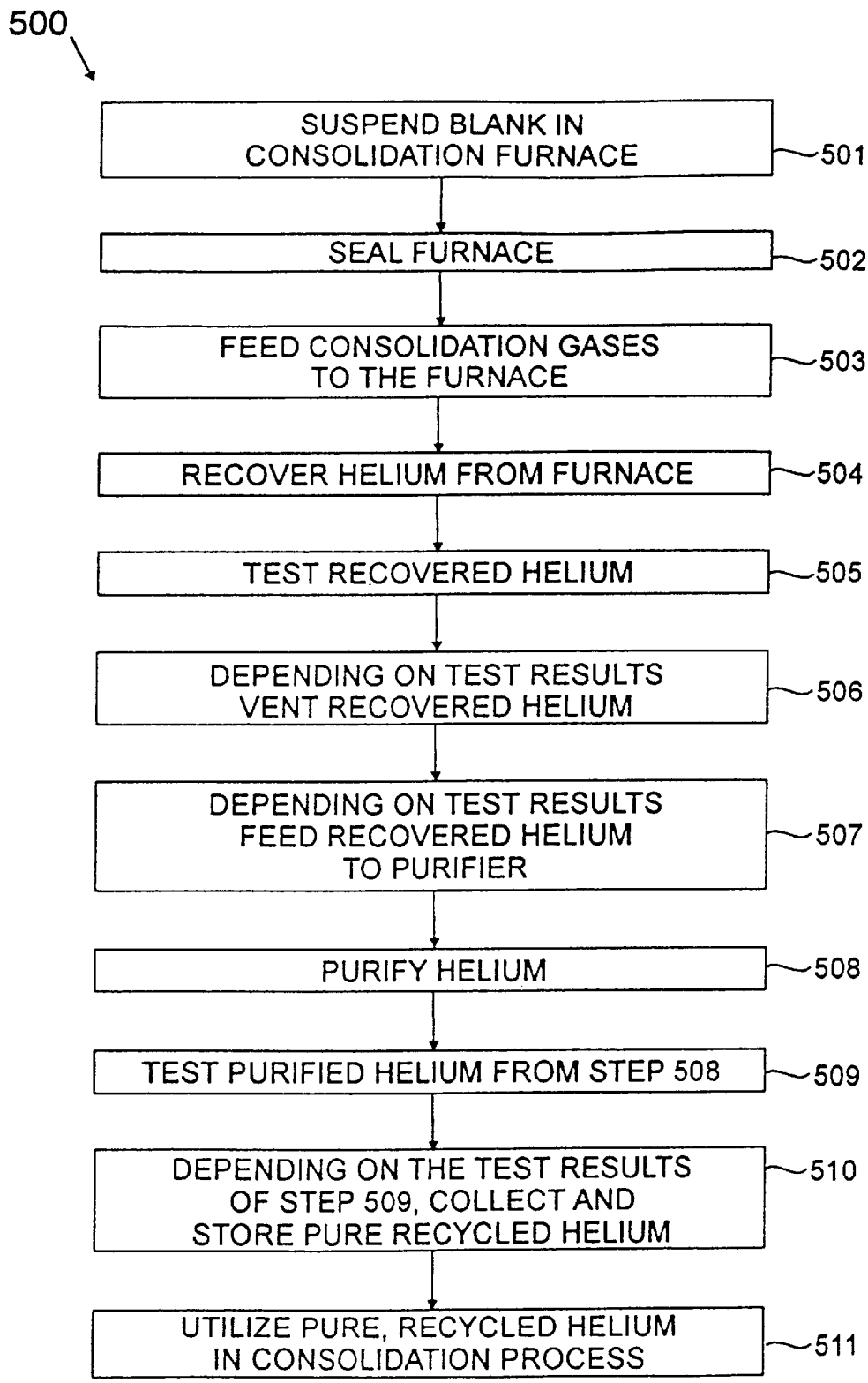
FIG. 5 is a flowchart illustrating a method according to the present invention for recycling helium from the consolidation process utilized in optical fiber manufacturing.

FIG. 5 illustrates details of one method or process 500 according to the present invention for recycling helium from the consolidation process employed in optical fiber manufacturing. In the method 500, in step 501, a blank, such as blank 411 is suspended in a consolidation furnace, such as the furnace 410. In step 503, consolidation gases including pure helium are fed to a consolidation furnace. By way of example, the consolidation gases may be fed by sources 401–403, through regulators 404–406 and MFCs 407–409 to consolidation furnace 410. In step 504, rather than venting spent helium to the scrubbers as is presently typical, helium is recovered utilizing, by way of example, recovery line 416, sensor and MFC 417, automatic valve 418 and compressor 419. In step 505, the recovered helium may be tested utilizing a sensor and processor, such as the sensor 417 and controller 450.

Depending upon the results of the testing in step 505, the recovered helium may be vented to scrubbers, such as scrubbers 460 utilizing a valve, such as the automatic valve 418, or alternatively, utilizing a valve which may be controlled manually by an operator. A valve such as automatic valve 418 may be controlled by the controller 450 or by its own internal processor or controller not shown. In step 507, also preferably depending upon the test results, helium is fed to a helium purifier, such as the helium purifier 420. In step 508, contaminants such as chlorine, hydrochloric acid, various chlorine compounds, oxygen, nitrogen, silicon dioxide and the like resulting from the consolidation process are removed thereby purifying the helium at the output of the purifier to the same level of purity as the pure source helium provided by a helium source, such as source 403. In step 509, the purity of the helium from step 508 is preferably tested for purity. Utilizing a sensor and controller, such as the sensor 421 and controller 450. If not adequately pure, the helium may be vented to scrubbers, such as the scrubbers 460 utilizing a controllable valve, such as the valve 422.

In step 510, tested pure recycled helium is stored, for example, in a tank such as tank 430. Finally, in step 511, the pure recycled helium is reutilized in the consolidation process. By way of example, the pure recycled helium may be fed from the pure recycled helium tank 430 through MFC 440 and mixed with makeup helium from source 403. A controller or controllers, such as the controller 450 will preferably control the mixing of recycled and fresh helium to make maximum usage of the pure recycled helium.

While the present invention has been disclosed in the context of several presently preferred embodiments, it will be recognized that a variety of modifications, such as the addition or removal of sensors, valves, MFCs, compressors, helium purifiers and tanks will be encompassed within the scope of the present invention as defined by the appended claims. As a further specific example of contemplated modifications, it will be understood that the teachings of U.S. Pat. Nos. 5,452,583 and 5,377,491 pertaining to recycling helium utilized in draw fiber cooling may be utilized in combination with the teachings of the present invention. Such changes will be expected to be made dependent on factors such as the specific application, advances or changes in pertinent technology, the amount of money to be spent, whether a new plant or retrofit of an existing plant is planned, and like factors. Without limitation, the following are examples of embodiments of the invention.

An apparatus for recycling helium utilized in the consolidation process of optical fiber manufacturing comprising: a source of pure helium; a delivery mechanism to controllably deliver pure helium from the source to a consolidation furnace; a recovery mechanism for recovering waste helium from the consolidation furnace; a feed apparatus to feed recovered waste helium to a helium purifier; said helium purifier operating to produce an output stream of recycled purified helium satisfactory for reutilization in the consolidation process; a recycle feed apparatus to feed recycled purified helium to the consolidation furnace wherein said recovery mechanism further comprises a sensor for sensing a control loop input parameter selected from the group of measured furnace pressure, waste helium flow, waste helium temperature or waste helium composition. The apparatus' recovery mechanism further comprises a valve for controlling the amount of waste helium from the consolidation furnace based upon the control loop input. The apparatus' recovery mechanism further comprises: a sensor for sensing the consolidation furnace pressure as a control loop input; and a controllable valve for controlling the amount of waste helium out of the consolidation furnace based on the control loop input. The apparatus further comprises a mixer for mixing recycled purified helium with pure helium from the source of pure helium; and further comprises a process controller to control the mix of recycled purified helium and pure helium. The apparatus further comprises a seal for sealing the top of the consolidation furnace. The apparatus' feed apparatus further comprises a first sensor for sensing impurities in the recovered waste helium. The apparatus further comprises a first sensor to sense the purity of the output stream of recycled purified helium. The apparatus further comprises a process controller connected to the first sensor for determining the levels of impurities in the recovered waste helium. The feed apparatus further comprises a controllable valve which operates to feed the recovered waste helium either to the helium purifier or to scrubbers and the controller operates to control the controllable valve based upon the determination of the level of impurities in the recovered waste helium. The first sensor may comprise: an infrared sensor which outputs a signal having resulting information about the nature of the impurities sensed in the recovered waste helium; or a gas chromatograph. The apparatus further comprises a second sensor for sensing the purity of the output stream of recycled purified helium. The apparatus further comprises one or more mass flow controllers to control the flow of pure helium, recovered waste helium or purified recycled helium flow; and wherein said one or more flow controllers are controlled by an overall process contoller.

A method for recycling helium utilized in optical fiber manufacturing comprising the steps of: collecting waste helium from a plurality of helium utilizing processes; controllably delivering the collected waste helium to a helium purifier which produces an output stream of purified recycled helium and an output stream of impurities; storing the purified recycled helium; and reutilizing the purified recycled helium in optical fiber manufacturing and further comprising the step of testing the levels of impurities in the collected waste helium; and further comprising the step of controllably mixing pure helium from a pure helium source with the recycled purified helium before reutilizing the purified recycled helium in optical fiber manufacturing; and further comprising the step of controlling the flow of the purified recycled helium reutilized in optical fiber manufacturing.

A method for recycling helium utilized in optical fiber manufacturing comprising the steps of: feeding a first stream of helium of a first level of purity to a first optical fiber manufacturing process; recovering waste helium with impurities from the first process; feeding the recovered waste helium to a first purifier; removing impurities utilizing the first purifier and producing a second stream of helium of a second level of purity; feeding the second stream of helium to a second optical fiber manufacturing process and wherein the first optical manufacturing process is consolidation; and wherein the first level of purity is at least 99.995% pure; and also wherein the recovered waste helium includes chlorine impurities and the purifier is operable to efficiently remove said chlorine impurities. The method further comprises the step of testing the impurities of the recovered waste helium. The method further comprises the step of testing the impurities of the second stream of helium. The method further comprises the step of collecting and storing the second stream of helium before feeding the second stream of helium to a second optical fiber manufacturing process. The second optical manufacturing process can be either draw furnace purging or draw fiber cooling. The method further comprises the step of controllably feeding makeup helium to the second optical fiber manufacturing process to insure an adequate supply of helium to the second optical fiber manufacturing process. With the method said second level of purity is less than said first level of purity. With the method said second level of purity is at least 95% pure. The method comprises the further step of: collecting additional waste helium from any helium utilizing process utilized in optical fiber manufacturing; feeding said additional waste helium to a second purifier; and removing impurities utilizing the second purifier to produce a third stream of helium of the first level of purity.

An apparatus for recycling helium utilized in optical fiber manufacturing comprising: a source of a first stream of helium of a first level of purity; a feed mechanism to feed said first stream to a first optical fiber manufacturing process; a recovery mechanism for recovering waste helium with impurities from the first process; a second feed mechanism for feeding the recovered waste helium to a first helium purifier; the first helium purifier producing a second stream of helium of a second level of purity; a third feed mechanism to feed the second stream of helium to a second optical fiber manufacturing process, wherein the first optical fiber manufacturing process is a consolidation process and the apparatus further comprises a consolidation furnace fitted with a seal to reduce helium losses, wherein the second optical fiber manufacturing process is either draw furnace purging or draw fiber cooling, and wherein the first level of purity is at least 99.995% pure; and also wherein the second level of purity is at least 95% pure but less than 99.995% pure; and further wherein the first purifier includes a chlorine purification apparatus to remove chlorine impurities.

What is claimed is:

1. A method for recycling helium utilized in the consolidation process of optical fiber manufacturing comprising the steps of:

feeding helium of a first level of purity to a consolidation furnace;

recovering waste helium from the consolidation furnace;

feeding recovered waste helium to a helium purifier;

purifying the recovered waste helium utilizing the helium purifier to produce an output stream of recycled purified helium satisfactory for reutilization in optical fiber manufacturing; and reutilizing the recycled purified helium in an optical fiber manufacturing process separate from said consolidation furnace.

2. The method of claim 1 wherein the optical fiber manufacturing process separate from said consolidation furnace is selected from the group including draw furnace purging and draw fiber cooling.

3. The method of claim 2 wherein the optical fiber manufacturing process separate from the consolidation furnace is draw furnace purging.

4. The method of claim 2 wherein the optical fiber manufacturing process separate from the consolidation furnace is draw fiber cooling.

5. The method of claim 1 wherein the consolidation furnace is vertically orientated and helium is fed into the furnace proximate the top of the furnace and recovered proximate the bottom of the furnace.

6. The method of claim 1 further comprising reutilizing recovered helium in the consolidation furnace.

7. The method of claim 1 further comprising the step of sealing the consolidation furnace to reduce the loss of helium at the top of the furnace, controlling the amount of waste helium from the consolidation furnace with a valve based upon a measured parameter selected from the group of measured furnace pressure, waste helium flow, waste helium temperature, or waste helium composition.

8. The method of claim 1 further comprising measuring consolidation furnace pressure as a control loop input and controlling the amount of waste helium out of the consolidation furnace utilizing a valve based on the control loop input.

9. The method of claim 1 further comprising the step of testing recovered waste helium to determine the nature of impurities.

10. The method of claim 1 further comprising the step of testing recovered waste helium to determine the nature of impurities utilizing a gas chromatograph to collect impurity data.

11. The method of claim 1 further comprising the step of testing the purified recycled purified helium prior to reutilizing the recycled purified helium in an optical fiber manufacturing process and only reutilizing the recycled purified helium in an optical fiber manufacturing process if the recycled purified helium is tested to be of adequate purity for reutilization.

12. The method of claim 1 wherein reutilizing recycled purified helium further comprises the step of utilizing a flow controller controlled by a process controller to control the flow of recycled purified helium.

13. The method of claim 12 wherein said flow controller receives as a control loop input variable, one or more measured variables, selected from the group of temperature, pressure, flow or composition of the recycled purified helium and controls said flow based on said one or more variables.

14. The method of either claim 1, 12, or 13 further comprising the step of mixing recycled purified helium with pure helium from a source of makeup helium.

15. The method of claim 14 further comprising the steps of controlling the flow of recycled purified helium and controlling the flow of pure helium.

16. The method of claim 15 wherein said steps of controlling are performed to maximize the utilization of recycled purified helium.

17. The method of claim 1 wherein the step of feeding recovered waste helium to a helium purifier further comprises the step of controlling the feed by adjusting an adjustable valve.

18. The method of claim 1 wherein the step of feeding recovered waste helium to a helium purifier further comprises utilizing a compressor to control the pressure at which recovered waste helium is fed to the helium purifier.

19. The method of claim 1 further comprising the step of feeding oxygen, nitrogen or sulfur hexafluoride through a regulator and a mass flow controller to the consolidation furnace.

20. The method of either claim 1 or 19 further comprising the step of feeding chlorine through a chlorine regulator and chlorine mass flow controller to the consolidation furnace.

21. The method of claim 1 wherein pure helium of a first level of purity is at least 99.995% pure and the recycled purified helium is at least 95% pure.

22. A method for recycling helium utilized in optical fiber manufacturing comprising the steps of:

collecting waste helium from at least two separate optical fiber manufacturing processes selected from the group including consolidation, draw furnace purging and draw fiber cooling;

controllably delivering the collected waste helium to a helium purifier which produces an output stream of purified recycled helium and an output stream of impurities;

storing the purified recycled helium; and reutilizing the purified recycled helium in an optical fiber manufacturing process selected from consolidation, draw furnace purging, and draw fiber cooling.

23. The method of claim 22 further comprising the step of testing the levels of impurities in the collected waste helium.

24. The method of claim 22 further comprising the step of controllably mixing pure helium from a pure helium source with the recycled purified helium before reutilizing the purified recycled helium.

25. The method of claim 22 further comprising the step of controlling the flow of the purified recycled helium during reutilization.

26. A method for recycling helium utilized in optical fiber manufacturing comprising the steps of:

feeding a first stream of helium of a first level of purity to a first optical fiber manufacturing process;

recovering waste helium with impurities from the first process;

feeding the recovered waste helium to a first purifier;

removing impurities utilizing the first purifier and producing a second stream of helium of a second level of purity; and feeding the second stream of helium to a second optical fiber manufacturing process separate from said first optical fiber manufacturing process.

27. The method of claim 26 wherein said first optical fiber manufacturing process comprises consolidation and said second optical fiber manufacturing process comprises draw furnace purging.

28. The method of claim 26 wherein said first optical fiber manufacturing process comprises consolidation and said second optical fiber manufacturing process comprises draw fiber cooling.

29. The method of claim 26 wherein said first level of purity is at least 99.995% pure and said second level of purity is at least 95% pure.

30. The method of claim 26 further comprising recovering waste helium from the second process and purifying said waste helium recovered from the second process.

31. The method of claim 26 wherein the recovered waste helium includes chlorine impurities and the purifier is operable to efficiently remove said chlorine impurities.

32. The method of claim 26 further comprising the step of testing the impurities of the recovered waste helium.

33. The method of claim 26 further comprising the step of testing the impurities of the second stream of helium.

34. The method of claim 26 further comprising the step of collecting and storing the second stream of helium before feeding the second stream of helium to a second optical fiber manufacturing process.

35. The method of claim 26 further comprising the step of controllably feeding makeup helium to the second optical fiber manufacturing process to insure an adequate supply of helium to the second optical fiber manufacturing process.

36. The method of claim 26 wherein said second level of purity is less than said first level of purity.

37. The method of claim 26 comprising the further step of:
collecting additional waste helium from any helium utilization process utilized in optical fiber manufacturing;
feeding said additional waste helium to a second purifier; and
removing impurities utilizing the second purifier to produce a third stream of helium of the first level of purity.

38. A method for recycling argon gas utilized in the consolidation process of optical fiber manufacturing comprising the steps of:
feeding argon gas of a first level of purity to a consolidation furnace;
recovering waste argon gas from the consolidation furnace;
feeding recovered waste argon gas to a purifier for purifying the argon gas;
purifying the recovered waste argon gas utilizing the argon gas purifier to produce an output stream of recycled purified argon gas satisfactory for reutilization in the consolidation process;
feeding recycled purified argon gas to the consolidation furnace; and
reutilizing the recycled purified argon gas in the consolidation process.

39. The method of claim 38 wherein the consolidation furnace is vertically orientated and argon is fed into the consolidation furnace proximate the top of the furnace and recovered proximate the bottom of the furnace.

40. An apparatus for recycling helium utilized in the consolidation process of optical fiber manufacturing comprising:
a source of pure helium;
a delivery mechanism to controllably deliver pure helium from the source to a consolidation furnace;
a recovery mechanism for recovering waste helium from the consolidation furnace, said recovery mechanism including a sensor for sensing a control loop input parameter selected from the group of measured furnace pressure, waste helium flow, waste helium temperature or waste helium composition;
a feed apparatus to feed recovered waste helium to a helium purifier;
said helium purifier operating to produce an output stream of recycled purified helium satisfactory for reutilization in the consolidation process; and
a recycle feed apparatus to feed recycled purified helium to the consolidation furnace.

41. The apparatus of claim 40 wherein said recovery mechanism further comprises a valve for controlling the amount of waste helium from the consolidation furnace based upon the control loop input.

42. The apparatus of claim 40 wherein the sensor comprises a sensor for sensing the consolidation furnace pressure as the control loop input and a controllable valve for controlling the amount of waste helium out of the consolidation furnace based on the control loop input.

43. The apparatus of claim 40 further comprising a mixer for mixing recycled purified helium with pure helium from the source of pure helium.

44. The apparatus of claim 43 further comprising a process controller to control the mix of recycled purified helium and pure helium.

45. The apparatus of claim 40 further comprising a seal for sealing the top of the consolidation furnace.

46. The apparatus of claim 40 wherein the feed apparatus further comprises a first sensor for sensing impurities in the recovered waste helium.

47. The apparatus of claim 46 further comprising a process controller connected to the first sensor for determining the levels of impurities in the recovered waste helium.

48. The apparatus of claim 47 wherein the feed apparatus further comprises a controllable valve which operates to feed the recovered waste helium either to the helium purifier or to scrubbers and the controller operates to control the controllable valve based upon the determination of the level of impurities in the recovered waste helium.

49. The apparatus of claim 46 wherein the first sensor is an infrared sensor which outputs a signal having resulting information about the nature of the impurities sensed in the recovered waste helium.

50. The apparatus of claim 46 wherein the first sensor comprises a gas chromatograph.

51. The apparatus of claim 46 further comprising a second sensor for sensing the purity of the output stream of recycled purified helium.

52. The apparatus of claim 40 further comprising a first sensor to sense the purity of the output stream of recycled purified helium.

53. The apparatus of claim 40 further comprising one or more mass flow controllers to control the flow of pure helium, recovered waste helium or purified recycled helium flow.

54. The apparatus of claim 53 wherein said one or more flow controllers are controlled by an overall process controller.

55. An apparatus of for recycling helium utilized in optical fiber manufacturing comprising:
- a source of a first stream of helium of a first level of purity;
- a feed mechanism to feed said first stream to a first optical fiber manufacturing process;
- a recovery mechanism for recovering waste helium with impurities from the first process;
- a second feed mechanism for feeding the recovered waste helium to a first helium purifier;
- the first helium purifier producing a second stream of helium of a second level of purity;
- a third feed mechanism to feed the second stream of helium to a second optical fiber manufacturing process.

56. The apparatus of claim 55 wherein the first optical fiber manufacturing process is a consolidation process and the apparatus further comprises a consolidation furnace fitted with a seal to reduce helium losses.

57. The apparatus of either claim 55 or 56 wherein the second optical fiber manufacturing process is either draw furnace purging or draw fiber cooling.

58. The apparatus of claim 55 wherein the first level of purity is at least 99.995% pure.

59. The apparatus of either claim 55 or 56 wherein the second level of purity is at least 95% pure but less than 99.995% pure.

60. The apparatus of claim 55 wherein the first purifier includes a chlorine purification apparatus to remove chlorine impurities.

* * * * *